(12) United States Patent
Braduke

(10) Patent No.: US 7,308,507 B1
(45) Date of Patent: Dec. 11, 2007

(54) METHOD, SYSTEM, AND COMPUTER-READABLE MEDIUM FOR REDIRECTING VIDEO TEXT DATA IN A COMPUTER NETWORK

(75) Inventor: Retnamoni R. Braduke, Duluth, GA (US)

(73) Assignee: American Megatrends, Inc., Norcross, GA (US)

( * ) Notice: Subject to any disclaimer, the term of this patent is extended or adjusted under 35 U.S.C. 154(b) by 688 days.

(21) Appl. No.: 10/717,289

(22) Filed: Nov. 19, 2003

(51) Int. Cl.
*G06F 15/16* (2006.01)
(52) U.S. Cl. .................. 709/246; 709/224; 709/231
(58) Field of Classification Search ........ 709/231–232, 709/223–224, 213, 246–248
See application file for complete search history.

(56) References Cited

U.S. PATENT DOCUMENTS

| 4,641,274 | A | * | 2/1987 | Swank ..................... 715/531 |
| 5,680,542 | A | * | 10/1997 | Mulchandani et al. ...... 709/248 |
| 6,331,855 | B1 | * | 12/2001 | Schauser ................... 709/217 |
| 6,608,930 | B1 | * | 8/2003 | Agnihotri et al. ........... 382/176 |
| 6,968,349 | B2 | * | 11/2005 | Owen et al. ................ 707/204 |
| 6,978,315 | B1 | * | 12/2005 | Burrell ...................... 709/246 |
| 2004/0078395 | A1 | * | 4/2004 | Rinkevich et al. .......... 707/201 |
| 2004/0181561 | A1 | * | 9/2004 | Knox et al. ................. 707/203 |

* cited by examiner

*Primary Examiner*—Philip Tran
(74) *Attorney, Agent, or Firm*—Hope Baldauff Hartman, LLC

(57) ABSTRACT

An enhanced console redirection method is provided in which only changed lines of video text data are sent from a remote computer to a local computer in a computer network. In a computer network a video buffer in the remote computer is checked for changed lines of video text data during a predetermined time interval. The predetermined time interval may be equal to the duration of a system timer interrupt in the remote computer. Any changed video text data found during the predetermined time interval is then sent from a controller in the remote computer to the local computer in the computer network. The controller in the remote computer may include a receive buffer which is checked for keyboard data sent from the local computer during the predetermined time interval. If the controller's receive buffer contains keyboard data from the local computer, then the keyboard data is stored in a keyboard controller in the remote computer.

17 Claims, 6 Drawing Sheets

METHOD, SYSTEM, AND COMPUTER-READABLE MEDIUM FOR REDIRECTING VIDEO TEXT DATA IN A COMPUTER NETWORK

TECHNICAL FIELD

The present invention is related to the management of a remote computer system in a computer network. More particularly, the present invention is related to redirecting video text data from a remote computer to a local computer in the computer network.

BACKGROUND OF THE INVENTION

Generally, the term "computer network" refers to a plurality of interconnected computer systems, such as, for instance, a client-server network. Some computer networks utilize a remote mainframe or host server computer for supporting one or more local client computers connected to the remote computer over the network. From a local computer, users may control or view activity on the remote computer over the network. Control of the remote computer may be accomplished through a process called console redirection.

Typically, console redirection involves sending all of the video text data stored in the video buffer of the remote computer to the local computer. Often, however, normal console redirection is inefficient as successive screens of video text data may only represent a few changed lines of text per screen. Thus, the communication between the remote computer and the local computer often includes previously sent video text data. As a result, the time required for sending a screen with only a few changed lines of video text data to the local computer is identical to the time required for sending an entire new screen of video text data resulting in the updating of the video display on the local computer to be unnecessarily slow.

It is with respect to these considerations and others that the present invention has been made.

SUMMARY OF THE INVENTION

In accordance with the present invention, the above and other problems are solved by providing an enhanced console redirection method in which only changed lines of video text data are sent from a remote computer to a local computer in a computer network. In accordance with other aspects, the present invention relates to a method of redirecting video text data in a computer network including a first computer and a second computer. According to the method, a video text data memory in the first computer, such as a video buffer, is checked for changed lines of video text data during a predetermined time interval. The predetermined time interval may be equal to the duration of a system timer interrupt in the remote computer. Any changed video text data found during the predetermined time interval is then sent from the first computer to the second computer in the computer network.

In checking the video text data memory for changed video text data during the predetermined time interval, the method may include selecting a line of video text data from among a plurality of lines of video text data stored in the video buffer as a current line of video text data, calculating a checksum for the current line of video text data, and comparing the calculated checksum to a previously saved checksum for the current line of video text data. If the calculated checksum is different than the previously saved checksum for the current line of video text data, then the method may include determining that the current line of video text data in the video buffer has changed and selecting the next line of video text data in the video buffer as the current line of video text data. The aforementioned steps may be repeated for each of the plurality of lines of video text data stored in the video buffer.

The checksum for the current line of video text data may be determined by calculating a unique value from an attribute of text in a line of video text data in combination with a line position of the text in the line of video text data. The checksum may then be saved in a memory location in the first computer after determining that the current line of video text data in the video buffer has changed. The computer may include a shared memory comprising a send buffer and a receive buffer. The current line of video text data may be stored in the send buffer in response to determining that the current line of video text data in the video buffer has changed. The method may further include determining whether the send buffer is full prior to storing the current line of changed video text data and, if the send buffer is determined to be full, sending the changed video text data from the send buffer to the second computer. The method may further include checking the receive buffer during the predetermined time interval for keyboard data entered in the second computer and, if the receive buffer contains the keyboard data, then storing the keyboard data in the first computer.

In accordance with still other aspects, the present invention relates to a computer system for redirecting video text data. The computer system includes a controller for sending and receiving data, a memory for storing executable program code, a video text data memory for storing lines of video text data, and a processor. The controller may include a shared memory comprising a send buffer and a receive buffer for sending and receiving data. The memory may include a random access memory (RAM). The executable program code may include a basic input/output system ("BIOS") and may be executed from an Extended Data Bios Area ("EBDA") of the RAM memory. The processor is functionally coupled to the controller, the memory, and video text data memory. The processor is responsive to computer-executable instructions contained in the program code and operative to check the video text data memory for changed video text data during a predetermined time interval. The processor is further operative to send changed video text data from the send buffer in the controller to a video display device. The controller may further include a receive buffer which is checked for keyboard data sent from a keyboard controller during the predetermined time interval. If the receive buffer contains keyboard data, then the keyboard data is stored in a keyboard controller in the computer system.

Aspects of the invention may be implemented as a computer process, a computing system, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION OF THE INVENTION

Figure 1:
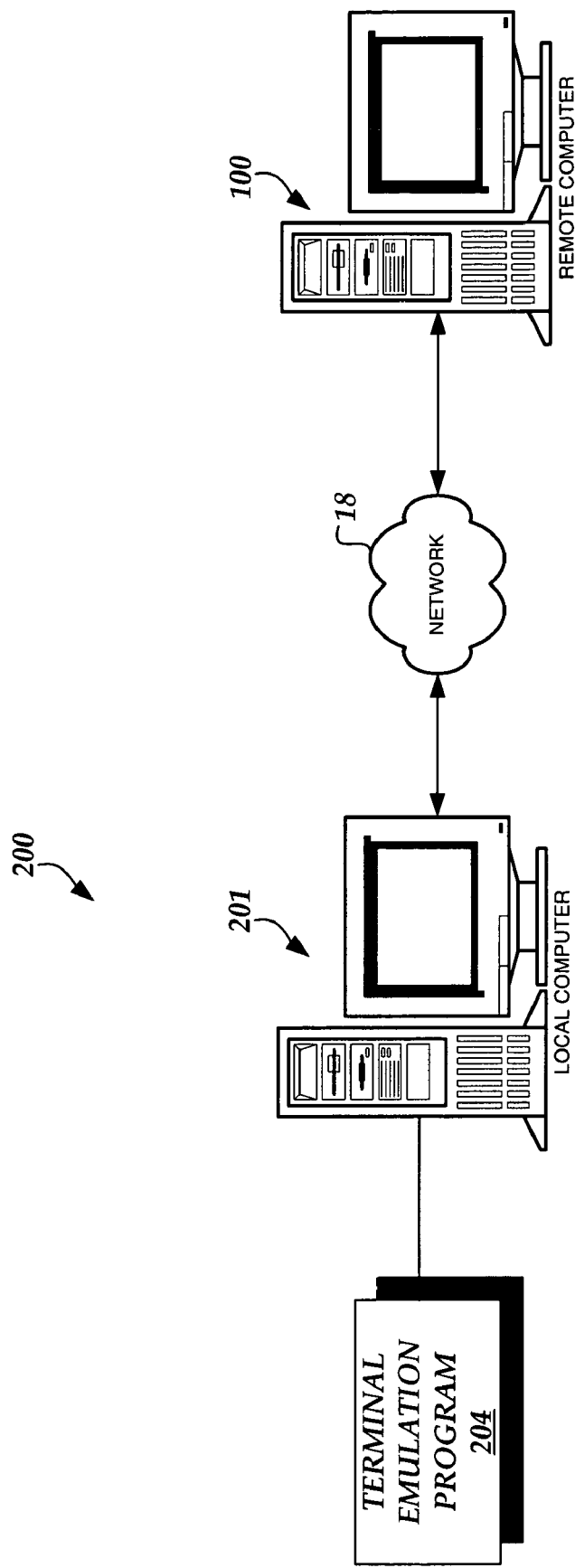
FIG. 1 illustrates a computer network architecture utilized in embodiments of the invention.

Embodiments of the present invention provide methods for enhanced console redirection in which only changed lines of video text data are sent from a remote computer to a local computer in a computer network. In the following detailed description, references are made to the accompanying drawings that form a part hereof, and in which are shown by way of illustration specific embodiments or examples. Referring now to the drawings, in which like numerals represent like elements through the several figures, aspects of the present invention and the exemplary operating environment will be described.

FIG. 1 and the following discussion are intended to provide a brief, general description of a suitable computing environment in which the invention may be implemented. While the invention will be described in the general context of program modules that execute in conjunction with an application program that runs on an operating system on a computer system, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multi-processor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer network architecture 200 for practicing the various embodiments of the invention will now be described. The computer network, which may be a client-server network, includes a client or local computer 201 operative to execute one or more application programs, such as terminal emulation program 204 for connecting to and communicating with a host server or remote computer 100 through the network 18. As is known by those skilled in the art, terminal emulation programs typically run on local or client computers and enable these computers to connect to and control one or more remote host servers in a computer network. The terminal emulation program 204 may be a "VT100" terminal emulator for communicating ANSI standard text data with remote computers over a network. Of course, it will be appreciated that the terminal emulation program 204 may emulate other terminals. Such alternative terminal emulators are known to those skilled in the art.

Figure 2:
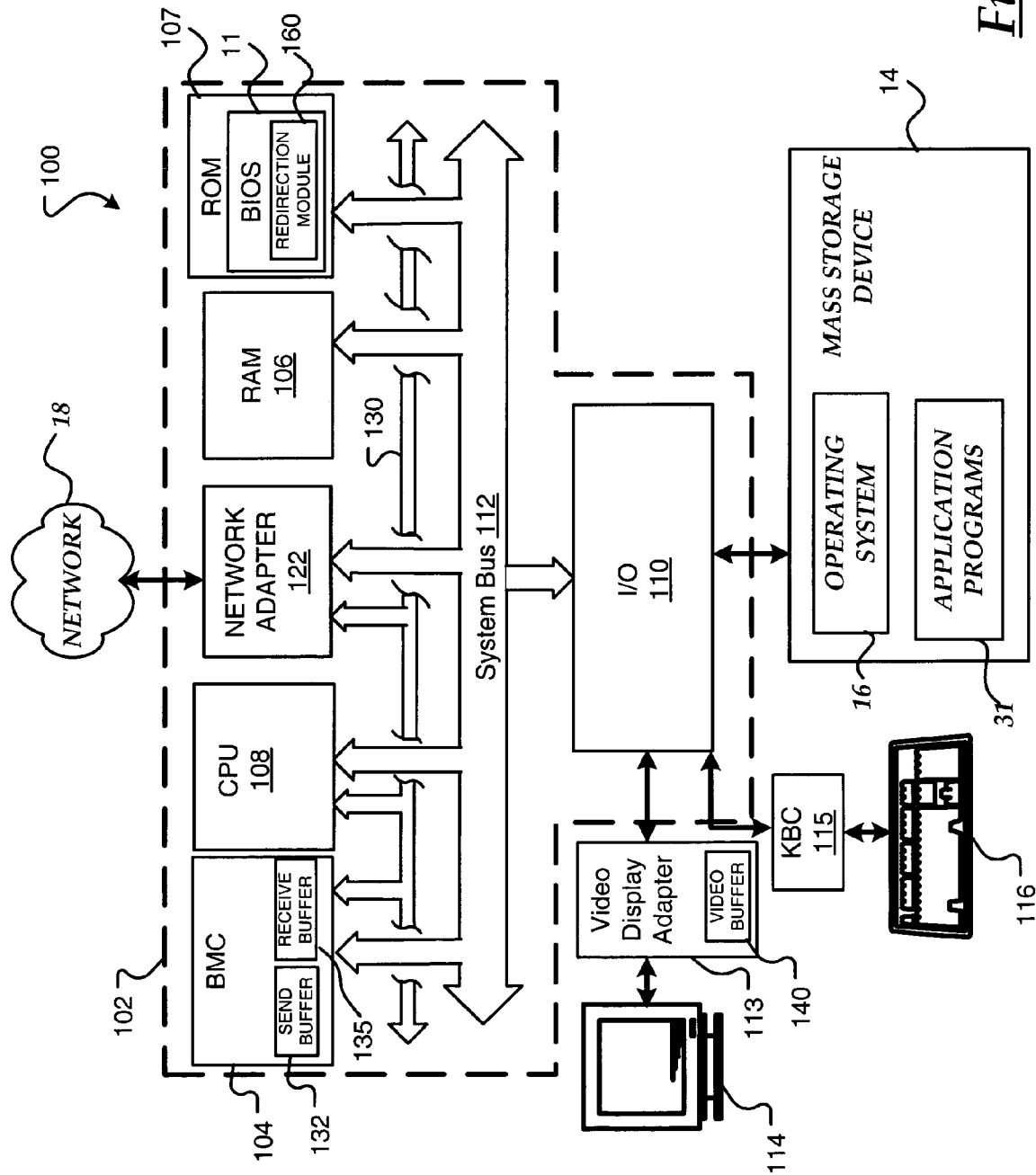
FIG. 2 illustrates a computer system architecture of the remote computer system illustrated in FIG. 1, which may be utilized in an embodiment of the invention.

Turning now to FIG. 2, a conceptual illustration of the remote computer system 100 associated with the present invention is shown in accordance with an embodiment of invention. The central intelligence of the remote computer system 100 is a baseboard 102, or "motherboard", which is a printed circuit board to which a multitude of components or devices may be connected by way of a system bus 112 or other electrical communication path (not shown). In an embodiment, these components include, without limitation, a controller such as the baseboard management controller (hereinafter, "BMC") 104, a central processing unit (hereinafter, "CPU") 108, a network adapter 122, a system memory and an Input/Output module 110. The system memory may include include a random access memory ("RAM") 106 and a read-only memory ("ROM") 107.

The network adapter 122 may be capable of connecting the remote computer system 100 to the local computer system 201 via the network 18. Connections which may be made by the network adapter 122 may include local area network (LAN) or wide area network (WAN) connections. LAN and WAN networking environments are commonplace in offices, enterprise-wide computer networks, intranets, and the Internet.

The ROM 107 may store a basic input/output system ("BIOS") 11 which is program code containing the basic routines that help to transfer information between elements within the remote computer system 100. These basic routines are accessed to boot the CPU as well as to initialize and interface hardware with operating system software. One such routine is the power-on self test ("POST") routine. The POST routine is executed after the computer is turned on for performing diagnostics and initializing system components. The BIOS 11 also includes a redirection module 160 which is an executable program module containing program code for redirecting video text data from the remote computer system 100 to the local computer system 201. The redirection module 160 will be described in greater detail in the description of FIGS. 3-4 below.

It is also contemplated that the system bus 112 may include other components that are not explicitly shown in FIG. 2. The system bus 112 provides a two-way communication path for all components connected to the system bus 112. The component that initiates a communication is referred to as a "master" component and the component to which the initial communication is sent is referred to as a "slave" component. A master component therefore issues an initial command to or requests information from a slave component. Each slave component is addressed, and thus communicatively accessible to the master component, using a particular slave address. Both master components and slave components are operable to transmit and receive communications over the system bus 112. Buses and the associated functionality of master-slave communications are well-known to those skilled in the art, and therefore not discussed in further detail herein.

The CPU 108 is a standard central processor that performs arithmetic and logical operations necessary for the operation of the remote computer system 100. CPUs are well-known in the art, and therefore not described in further detail herein. In general, the BMC 104 is a microcontroller that monitors the operation of the remote computer system 100. For example, the BMC 104 may monitor health-related aspects associated with the remote computer system 100, such as available or used capacity of memory devices within the remote computer system 100.

To accomplish the above-noted, and other, monitoring functions, the BMC 104 is communicatively connected to one or more components either directly or by way of a management bus 130. Like the system bus 112, the component that initiates communication on a bus is referred to a master and the component to which the communication is sent is referred to a slave. As such, the BMC 104 functions as the master on the management bus 130 in most circumstances, but may also function as a slave in other circumstances. Each of the various components communicatively connected to the BMC 104 by way of the management bus is addressed using a slave address. The management bus 130 is used by the BMC 104 to request and receive various operating and performance related parameters from the one or more components also communicatively connected to the management bus 130. In one embodiment, the management bus 130 may be an I$^2$C® bus, which is manufactured by Phillips Semiconductors® and described in detail in the I$^2$C® bus Specification, version 2.1 (January 2000).

The firmware of the BMC 104 adheres to the Intelligent Platform Management Interface (IPMI) industry standard for system monitoring and event recovery. The IPMI standard is well-known to those of ordinary skill in the industry, and therefore not described in detail herein. Rather, revision 1.1 of the IPMI Specification, version 1.5, release date Feb. 20, 2002, is incorporated by reference. The BMC 104 monitors operating and performance-related parameters received from various components of the computer system 100 in order to determine whether an "event" is occurring within the system 100. In addition, it is also contemplated that the BMC 104 may also be connected to and receive data from components in communication with the network adapter 122 or from components connected to a bus (e.g., system bus 112) other than the management bus 130. For example, the BMC 104 may receive data from the local computer 201 through the network adapter 122 over the network 18. The BMC 104 may also be utilized by the remote computer 100 to send data to the local computer 201 via the LAN adapter 122 over the network 18. The BMC 104 may also include a shared memory which may be accessed by various components in the computer system 100. In one embodiment, the shared memory may include a send buffer 132 and a receive buffer 135 for sending and receiving data between various components in the remote computer system 100 or alternatively in the local computer system 201 via the network adapter 122 over the network 18.

The Input/Output module 110 is used as a communication medium between any number and type of peripheral devices and the system bus 112. Communications destined for the CPU 108, the BMC 104 or any other component coupled to the system bus 112 and issued by a peripheral device must therefore pass through the Input/Output module 110 to the system bus 112 and then to the necessary component. As shown in FIG. 2, the Input/Output module 110 is connected a mass storage device 14 for storing an operating system 16 and application programs 31. The operating system 16 comprises a set of programs that control operations of the remote computing system 100 and allocation of resources. The set of programs, inclusive of certain utility programs, also provide a graphical user interface to the user. An application program is software that runs on top of the operating system software and uses computer resources made available through the operating system to perform application specific tasks desired by the user.

The mass storage device 14 and its associated computer-readable media, provide non-volatile storage for the remote computer system 100. Although the description of computer-readable media contained herein refers to a mass storage device, such as a hard disk or CD-ROM drive, it should be appreciated by those skilled in the art that computer-readable media can be any available media that can be accessed by the remote computer system 100. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

The Input/Output module 110 is also connected to a keyboard controller 115 which controls the transfer of data between the computer system and a user input module 116, e.g., a keyboard. The Input/Output module 110 is also connected to a video display adapter 113 which enables the display of video data (i.e., text and/or graphics) on a display unit 114. It should be understood that the video display adapter 113 may offer both text and graphics video modes for display on the display unit 114. In text mode only text (i.e., ASCII) characters may be displayed, while in graphics mode the display unit may display any bit-mapped image. In one embodiment, the video display adapter 113 is set to text mode for displaying text or ASCII characters on the display unit 114. The video display adapter 113 also contains a video text data memory or video buffer 140 for temporarily storing one or more lines of video data while displayed on the display unit 114. It will be appreciated that the local computer system 201 described briefly above with respect to FIG. 1 may include many or all of the elements described above relative to the remote computer system 100.

Figure 3:
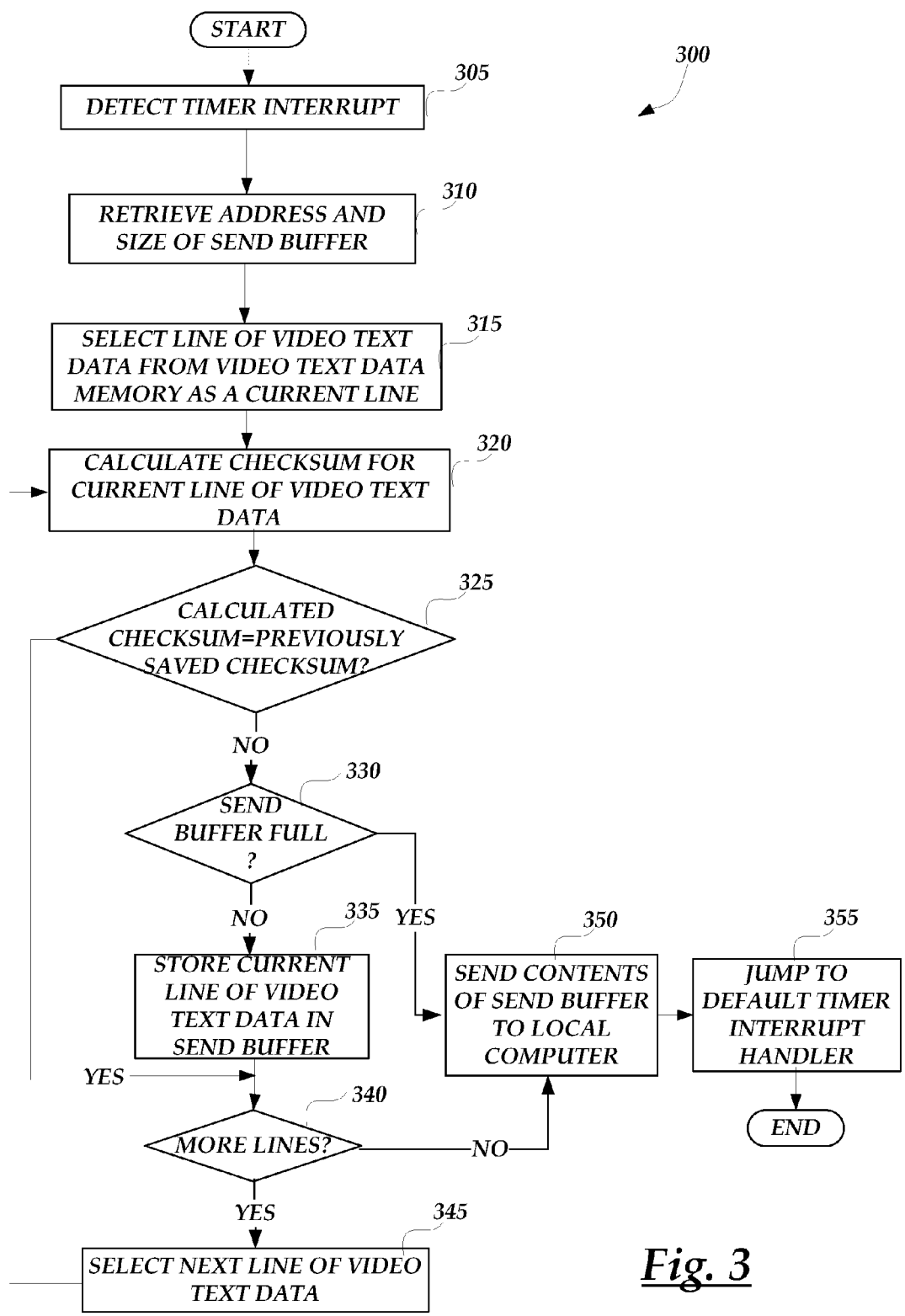
FIG. 3 is a flowchart showing illustrative logical operations for redirecting video text data between the remote computer system and the local computer system in the computer network architecture illustrated in FIGS. 1-2, according to various embodiments of the invention.

FIG. 3 shows illustrative logical operations 300 for redirecting video text data between the remote computer system 100 and the local computer system 201 in the computer network 200 described above in FIGS. 1-2, according to various embodiments of the invention. The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Turning now to FIG. 3, the logical operations 300 begin at operation 305 where the redirection program module 160 is executed by the CPU 108 and detects a system timer interrupt in the remote computer system 100. In one embodiment, the program code may be part of the BIOS 11 stored in the ROM 107. As is known to those skilled in the art, an interrupt is a signal informing a computer program that an event has occurred. An interrupt is associated with an "interrupt handler," which is a software routine or procedure which takes control of the CPU when the interrupt occurs. For example, when a user presses a key on a computer keyboard, a specific interrupt handler is triggered alerting the CPU to retrieve a special code representing the keystroke, give the keystroke to an application program (e.g., the operating system), and display the character on a computer screen.

Figure 4:
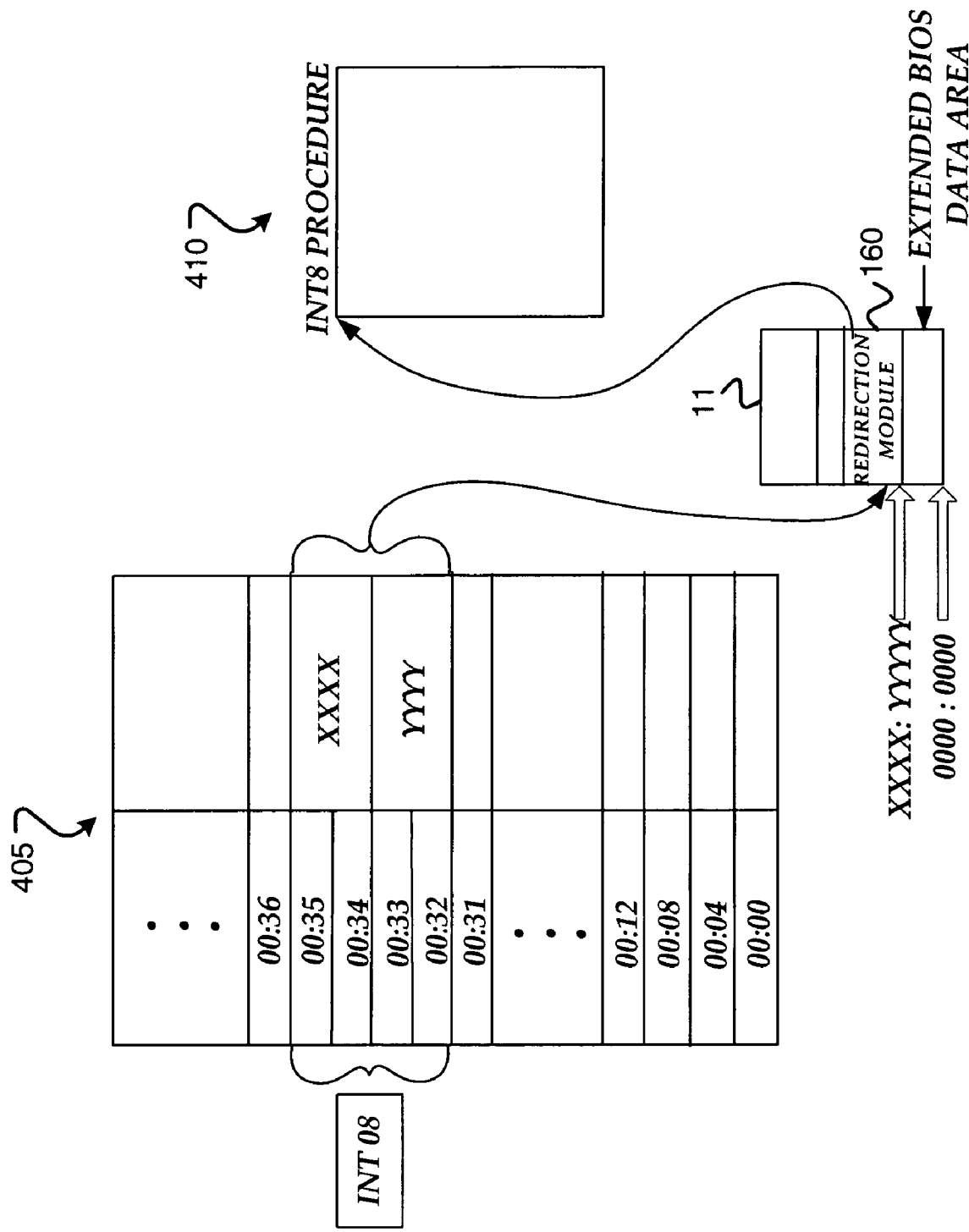
FIG. 4 is a block diagram illustrating procedures for redirecting video text data utilizing the redirection program module illustrated in FIG. 2, according to an embodiment of the invention.

As is further known to those skilled in the art, a system timer interrupt is one of several hardware interrupts in a computer system which signals the CPU that an event has occurred. In a typical computer IBM-compatible computer system, the system timer interrupt (INT-08) is generated 18.2 times per second, or every 54.9 milliseconds. In one embodiment, the program code in the redirection program module 160 may be copied into a memory area in RAM (i.e., the interrupt vector table) occupied by the program code for calling the default interrupt handler routine for the system timer interrupt. Thus, when the system timer interrupt is generated by the remote computer system 100, the program code in the redirection program module 160 is executed before the default interrupt handler routine. After the instructions contained within the program code in the redirection program module 160 have been executed, the redirection program module 160 will then call the default timer interrupt handler routine. A block diagram showing the above-described procedure is shown in FIG. 4, and will be described in greater detail in the description of FIG. 4, below.

Figure 5:
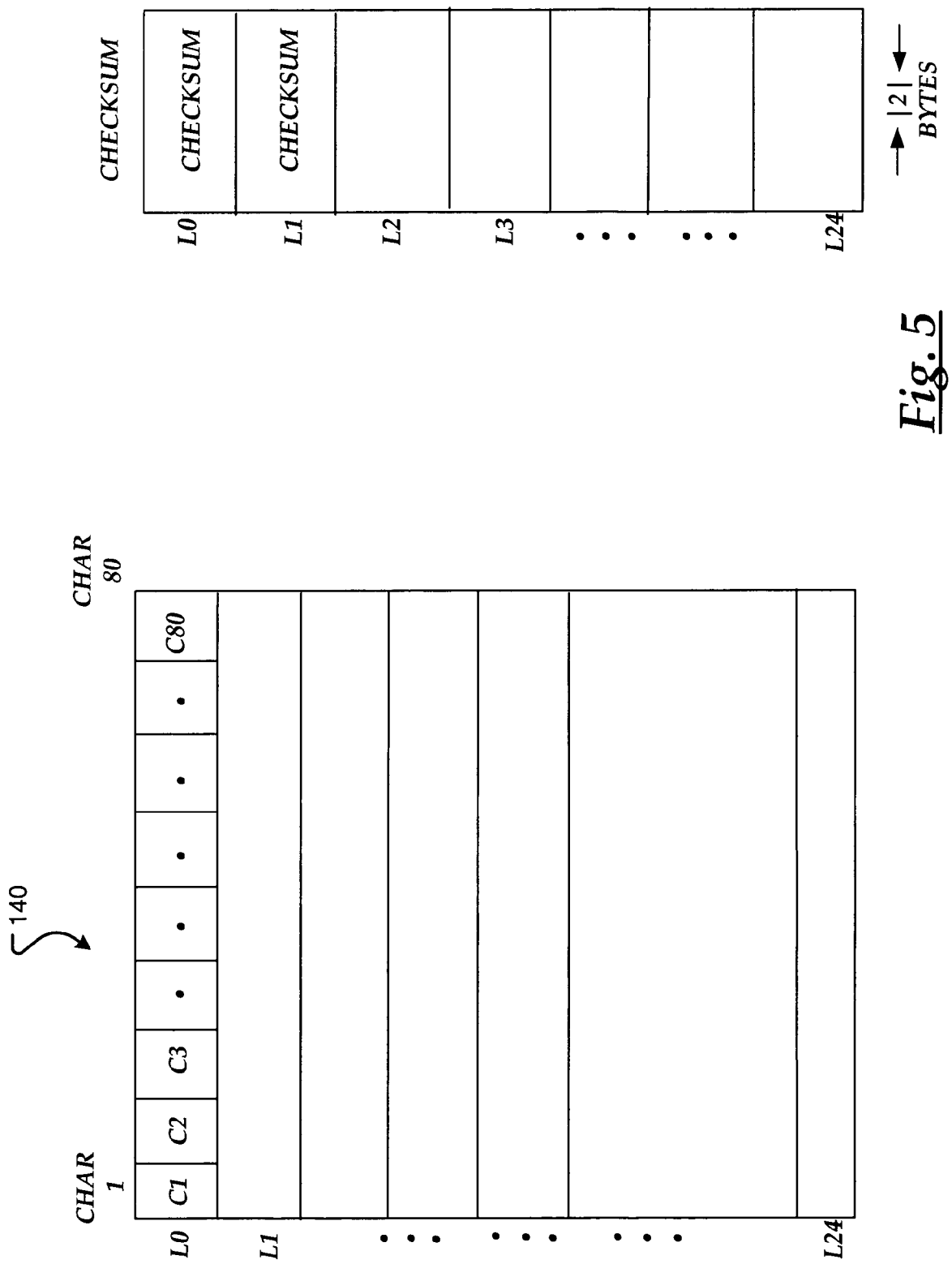
FIG. 5 is a block diagram showing illustrative contents of the video buffer illustrated in FIG. 2 during execution of the redirection program module, according to an embodiment of the invention.

The logical operations 300 continue from operation 305 to operation 310 where the redirection program module 160 retrieves the memory address location and the size of the send buffer 132 in the BMC 104 which will be utilized to store redirected video text data prior to being sent from the BMC 104 to the local computer 201. The logical operations 300 then continue from operation 310 to operation 315 where the redirection program module 160 accesses the video buffer 140 in the video display adapter 113 and selects a line of stored video text data. For example, the redirection program module 160 may select the first line of video text data from among twenty-five lines of data in the video buffer 140. As discussed in the description of FIG. 2 above, the video buffer 140 is utilized by the video display adapter 113 for temporarily storing one or more lines of video text data prior to displaying the video text data on the display unit 114. In one embodiment, the number of lines capable of being stored in the video buffer 140 may be equal to the number of lines capable of being displayed on the display unit 114. A block diagram showing illustrative contents of the video buffer 140 is shown in FIG. 5, and will be described in greater detail in the description of FIG. 5, below.

The logical operations 300 continue from operation 315 to operation 320 where the redirection program module 160 calculates a checksum for the selected line of video text data in the video buffer 140. A checksum is defined as a unique numerical value which is computed based on the characters in the selected line of video text data. In one embodiment, the checksum may be calculated from the identity of the characters in the line of video text data (e.g., "A," "B," etc.), the position of the characters, and a text attribute associated with the characters (e.g., bold, italics, underline, etc.). Once a checksum for a line of video data is calculated, it is saved in a shared memory location in the RAM 106. It will be appreciated that the number of saved checksums may be equal to the number of lines of video text data stored in the video buffer 140.

The logical operations 300 then continue from operation 320 to operation 325 where the redirection program module 160 compares the just calculated checksum for the selected line of video text data to any previously saved checksums in the RAM 106. If the just calculated checksum is not equal to any of the previously saved checksums, then the selected line of video text data is changed video text data and the logical operations 300 continue from operation 325 to operation 330 where the redirection program module 160 communicates with the BMC 104 to determine if the send buffer 132 is full. If at operation 330, the redirection program module 160 determines that the send buffer 132 is not full, then the redirection program module 160 stores the changed line of video text data in the send buffer 132 at operation 335. The logical operations 300 then continue from operation 335 to operation 340 where the redirection module 160 determines whether there are any more lines of video text data stored in the video buffer 140.

If at operation 340 it is determined that there are additional lines of video text data stored in the video buffer 140, the logical operations 340 continue to operation 345 where the redirection program module 60 selects the next line of video text data. The logical operations 300 then return to operation 320. If however, at operation 340 it is determined that there are no more lines of video text data in the video buffer 140, then the logical operations 300 continue from operation 340 to operation 350 where the redirection program module 160 instructs the BMC 104 to send the contents of the send buffer 132 (i.e., the changed lines of video text data) through the network adapter 122 to the local computer 201 via the network 18. The logical operations 300 then continue from operation 350 to operation 355 where the instructions contained in the redirection program module 60 call the default system timer interrupt handler.

Returning now to operation 325, if the just calculated checksum is equal to any of the previously saved checksums, then the selected line of video text data is unchanged from previous video text data and the logical operations 300 continue from operation 325 to operation 340 where the redirection program module 160 determines if there are additional lines of video text data in the video buffer 140. The logical operations 300 then continue from operation 340 as described above. Returning now to operation 330, if the redirection program module 160 determines that the send buffer 132 is full, then the logical operations 300 continue to operation 350 where the redirection program module 160 instructs the send buffer 132 to send the stored changed lines of video text data to the local computer 201 through the network adapter 122. The logical operations 300 then continue from operation 350 as described above. It will be appreciated that in one embodiment, the above-described operations 300 are carried out every system timer interrupt (i.e., ever 54.9 milliseconds). It will further be appreciated that after the video text data is sent to the local computer, the existing video text data on the local computer may be updated with the changed video text data from the remote computer.

FIG. 4 is a block diagram showing how the redirection program module 160 is copied into the memory area in RAM occupied by the program code for calling the default interrupt handler for the system timer interrupt as discussed above with respect to FIG. 3. During the POST routine on the remote computer system 100, the BIOS program code copies the redirection program module 160 into the extended BIOS data area ("EBDA") of the RAM 106. As is known to those skilled in the art, the BIOS creates a BIOS data area at a memory location in RAM when the computer is turned on (i.e., during POST). After the redirection program module 160 is copied into the EBDA, the memory address of the redirection program module 160 may then be copied into the memory locations in the Interrupt Vector Table 405 in the RAM 106 (i.e., locations 00:32 and 00:34) occupied by the program code for calling the default interrupt handler routine for the system timer interrupt (INT-08). Once a system timer interrupt (INT-08) is generated by the remote computer system 100, the memory address of the redirection program module 160 is accessed from the Interrupt Vector Table 405 and control of the CPU 108 is given to the redirection program module 160. After the instructions in the redirection program module 160 for redirecting video text data have been executed, control of the CPU 108 "jumps" to the default interrupt handler (INT8 procedure 410) for the system timer interrupt. That is, the redirection program module 160 executes the program code for calling the default timer interrupt handler. It will be appreciated that in one embodiment, the program code for calling the INT8 procedure 410 may be included in the redirection program module 160.

FIG. 5 is a block diagram showing the contents of the video buffer 140 as discussed above with respect to FIG. 3 according to an embodiment of the invention. As shown in FIG. 5, the video buffer 140 includes 25 lines of video text data (shown as lines L0 through lines L24). Each line of video text data in the video buffer 140 may have up to 80 characters of text. It should be understood that each character in a line of video text data may also have an associated attribute (e.g., bold, italics, underline, etc.) represented by a numerical value. As discussed above in the description of FIG. 3, a checksum value may be calculated based on the line position of each character, the identify of each character in the alphabet, and the attribute of each character.

It will be appreciated that in an alternative embodiment of the invention, the redirection program module 160 may also contain code for retrieving received keyboard data (representing user keyboard input) from the local computer 201 stored in the receive buffer 132 of the BMC 104 during a system timer interrupt. It will further be appreciated that with respect to the redirection program module 160, the program code for redirecting video text data may be executed in conjunction with the program code for retrieving received keyboard data during the same timer interrupt, in one embodiment of the invention. It should be understood that in one embodiment, the keyboard data from the local computer 201 is communicated to the BMC 104 via the network adapter 122 over the network 18. The keyboard data may then be stored in the receive buffer 135 by the BMC 104.

Figure 6:
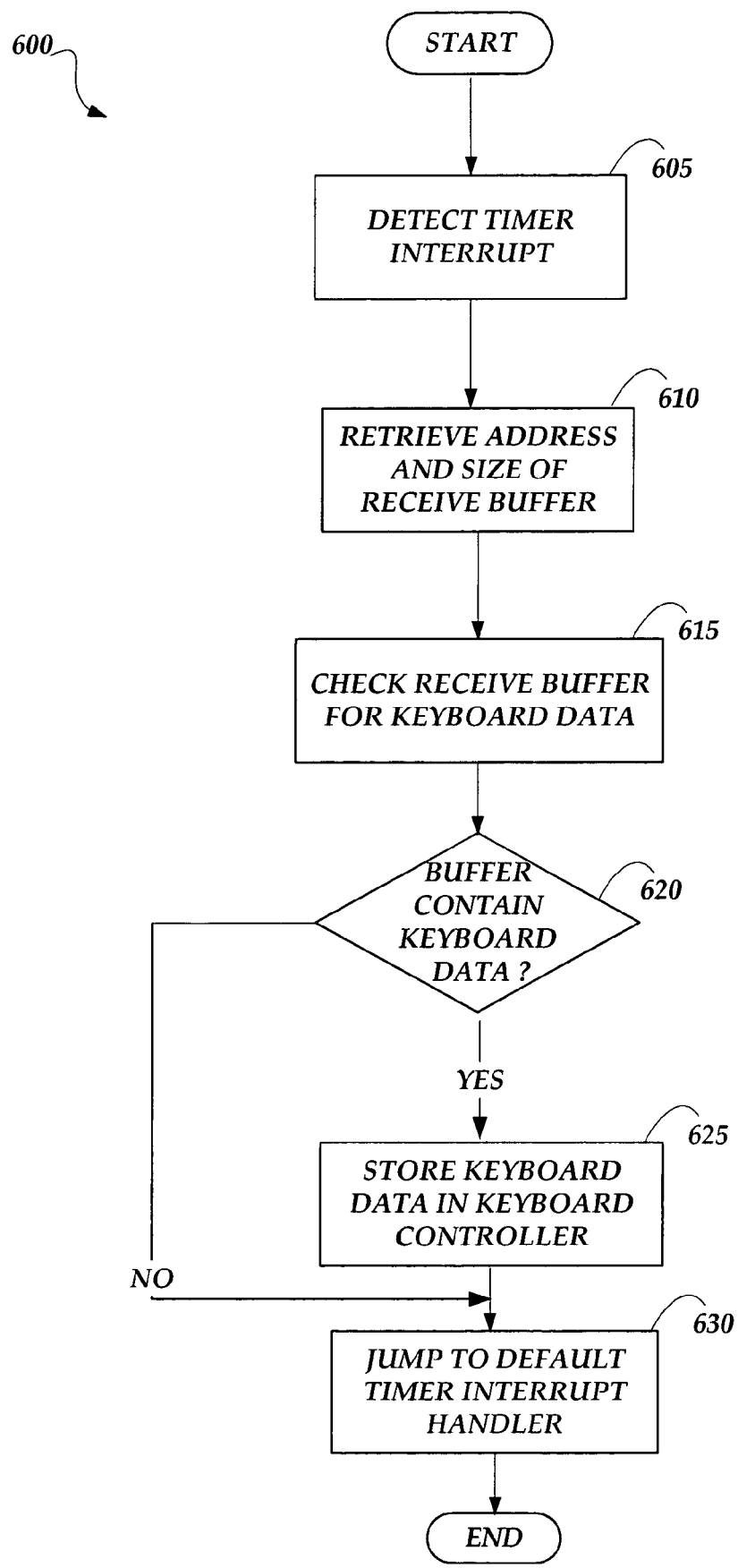
FIG. 6 is a flowchart showing illustrative logical operations for storing keyboard data from the local computer illustrated in FIG. 1, according to an embodiment of the invention.

FIG. 6 shows illustrative logical operations 600 for storing keyboard data from the local computer 201 in the remote computer 100. The logical operations 600 begin at operation 605 where the redirection program module 160 detects a system timer interrupt. The operation 605 may be identical to the operation 305 discussed in detail with respect to FIG. 3 above. The logical operations 600 then continue from operation 605 to operation 610 where the redirection program module 160 determines the address and size of the receive buffer 135 in the BMC 104. The logical operations 600 then continue from operation 610 to operation 615 where redirection program module checks the receive buffer 135 for keyboard data entered on the local computer 201. The logical operations 600 then continue from operation 615 to operation 620.

At operation 620, if the redirection program module 160 determines that the receive buffer 135 contains keyboard data, then the logical operations 600 continue from operation 620 to operation 625 where the keyboard data is stored in the keyboard controller 115 of the remote computer 100. In this manner, keyboard input from the local computer 201 may be displayed on the remote computer 100. The logical operations 600 then continue from operation 625 to operation 630 where the redirection program module 160 calls the default timer interrupt handler for the system timer interrupt as previously discussed above with respect to FIG. 4. Returning now to operation 620, if the redirection program module 160 determines that the receive buffer 135 does not contain any keyboard data, the logical operations 600 continue from operation 620 to operation 630. The logical operations 600 then end.

It will be appreciated that embodiments of the present invention provide an enhanced console redirection method in which only changed lines of video text data are sent from a remote computer to a local computer in a computer network. Embodiments of the present invention also provide a method for storing received keyboard data from a local computer in a remote computer in a computer network. Although the invention has been described in language specific to computer structural features, methodological acts and by computer readable media, it is to be understood that the invention defined in the appended claims is not necessarily limited to the specific structures, acts or media described. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A method of redirecting video text data in a computer network, the method comprising:
    (a) during a timer interrupt for a first computer, selecting a line of video text data from among a plurality of lines of video text data stored in a video text data memory as a current line of video text data;
    (b) calculating a checksum for the current line of video text data;
    (c) comparing the calculated checksum to a previously saved checksum for the current line of video text data;
    (d) if the calculated checksum is different than the previously saved checksum for the current line of video text data, then determining that the current line of video text data in the video text data memory has changed;

(e) saving the calculated checksum in a memory location after determining that the current line of video text data in the video text data memory has changed;

(f) storing the current line of video text data in a shared memory in response to determining that the current line of video text data in the video text data memory has changed;

(g) selecting the next line of video text data in the video text data memory as the current line of video data;

(h) repeating the operations (b)-(g) for each of the plurality of lines of video text data stored in the video text data memory; and (i) sending only the changed video text data from the first computer to a second computer in the computer network.

2. The method of claim 1, wherein calculating a checksum for the current line of video text data comprises calculating a unique value from at least one of:

an attribute of text in the line of video text data; and a line position of the text in the line of video text data.

3. The method of claim 2, wherein the text comprises a plurality of characters in the line of video text data.

4. The method of claim 1 further comprising determining whether the shared memory is full prior to storing the current line of changed video text data in the memory.

5. The method of claim 1, wherein sending only the changed video text data from the first computer to a second computer in the computer network comprises sending each changed line of video text data stored in the shared memory during the timer interrupt from the first computer to the second computer in the computer network.

6. The method of claim 5, wherein sending each changed line of video text data stored in the shared memory during the timer interrupt from the first computer to the second computer in the computer network comprises sending each changed line of video text data stored in the shared memory from the first computer to the second computer in the computer network in response to determining that the memory is full.

7. The method of claim 1, wherein the shared memory comprises a send buffer and a receive buffer.

8. The method of claim 7, further comprising:

during the timer interrupt, checking the receive buffer in the first computer for keyboard data from the second computer; and if the receive buffer contains the keyboard data, then storing the keyboard data in the first computer.

9. A computer system for redirecting video text data, comprising:

a controller for sending and receiving data;

a memory for storing executable program code;

a video buffer for storing video text data while displayed on a display unit; and a processor, functionally coupled to the controller, the memory, and the video text data memory, the processor being responsive to computer-executable instructions contained in the program code and operative to:

(a) during the system timer interrupt, select a line of video text data from among a plurality of lines of video text data stored in the video text data memory as a current line of video text data;

(b) calculate a checksum for the current line of video text data;

(c) compare the calculated checksum to a previously saved checksum for the current line of video text data;

(d) if the calculated checksum is different than the previously saved checksum for the current line of video text data, then determine that the current line of video text data in the video text data memory has changed;

(e) save the calculated checksum in a memory location in the computer system after determining that the current line of video text data in the video text data memory has changed;

(f) store the current line of video text data in the shared memory in the controller in response to determining that the current line of video text data in the video text data memory has changed;

(g) select the next line of video text data in the video text data memory as the current line of video text data;

(h) repeat the operations (b)-(g) for each of the plurality of lines of video text data stored in the video text data memory; and (i) send the changed video text data from the controller to a video display device.

10. The computer system of claim 9, wherein the processor in calculating a checksum for the current line of video text data, is operative to calculate a unique value from at least one of:

an attribute of text in the line of video text data; and a line position of the text in the line of video text data.

11. The computer system of claim 9, wherein the processor is further operative to determine whether the shared memory is full prior to storing the current line of changed video text data.

12. The computer system of claim 9, wherein the memory is a random access memory.

13. The computer system of claim 9, wherein the executable program code comprises a basic input/output system.

14. The computer system of claim 9, wherein the executable program code is stored in an extended BIOS data area in the memory.

15. The computer system of claim 9, wherein the shared memory comprises a send buffer and a receive buffer.

16. The computer system of claim 15, wherein the processor is further operative to:

during the system timer interrupt, check the receive buffer for keyboard data sent from a keyboard controller; and if the receive buffer contains the keyboard data, then store the keyboard data in the computer system.

17. A computer-readable medium having computer-executable instructions for performing a method of redirecting video text data in a computer network, comprising:

(a) during a system timer interrupt of a first computer in the computer network, selecting a line of video text data from among a plurality of lines of video text data stored in a video text data memory as a current line of video text data;

(b) calculating a checksum for the current line of video text data;

(c) comparing the calculated checksum to a previously saved checksum for the current line of video text data;

(d) if the calculated checksum is different than the previously saved checksum for the current line of video text data, then determining that the current line of video text data in the video text data memory has changed;

(e) saving the calculated checksum in a memory location after determining that the current line of video text data in the video text data memory has changed;
(f) storing the current line of video text data in a shared memory in response to determining that the current line of video text data in the video text data memory has changed;
(g) selecting the next line of video text data in the video text data memory as the current line of video text data;
(h) repeating the operations (b)-(g) for each of the plurality of lines of video text data stored in the video text data memory; and
(i) sending each changed line of video text data stored in the shared memory during the system timer interrupt from the first computer to the second computer in the computer network.

* * * * *